United States Patent [19]

Kittle et al.

[11] 4,329,857
[45] May 18, 1982

[54] COUPLER COVER

[75] Inventors: Carl E. Kittle; James L. Price, both of Cedar Falls, Iowa

[73] Assignee: Deere & Company, Moline, Ill.

[21] Appl. No.: 150,453

[22] Filed: May 16, 1980

[51] Int. Cl.³ .............................................. F16D 3/84
[52] U.S. Cl. .................................. 220/229; 138/89; 277/212 FB; 271/237 A; 74/18; 464/173
[58] Field of Search .................... 64/32 F, 32 R, 3, 8, 64/21, 22; 277/65, 82, 207 R, 207 A, 212 R, 212 F, 212 FB, 237 R, 237 A; 74/18, 18.1, 18.2; 138/89; 285/225, DIG. 2; 220/229

[56] References Cited

U.S. PATENT DOCUMENTS

| | | | |
|---|---|---|---|
| 2,803,370 | 8/1957 | Lennard | 220/229 |
| 3,211,019 | 10/1965 | Roach et al. | 64/3 |
| 3,368,830 | 2/1968 | French | 277/207 A |
| 3,451,700 | 6/1969 | Smith | 277/212 FB |

FOREIGN PATENT DOCUMENTS 2820566 11/1979 Fed. Rep. of Germany ...... 220/229
370711 4/1939 Italy ...................................... 138/89

Primary Examiner—P. S. Lall

[57] ABSTRACT

An improved coupler cover is provided for preventing foreign matter from contaminating the end surface of a female coupler. This improved coupler cover comprises two diaphragms axially aligned adjacent to each other. Each diaphragm contains a multiplicity of slits which extend outward from the center of the diaphragm to form equal size pie-shaped sections. The multiple slits of the first diaphragm are also offset in position from the multiple slits of the second disphragm. The two diaphragms are secured in a retainer which holds both of the diaphragms relative to the end surface of the coupler.

13 Claims, 7 Drawing Figures

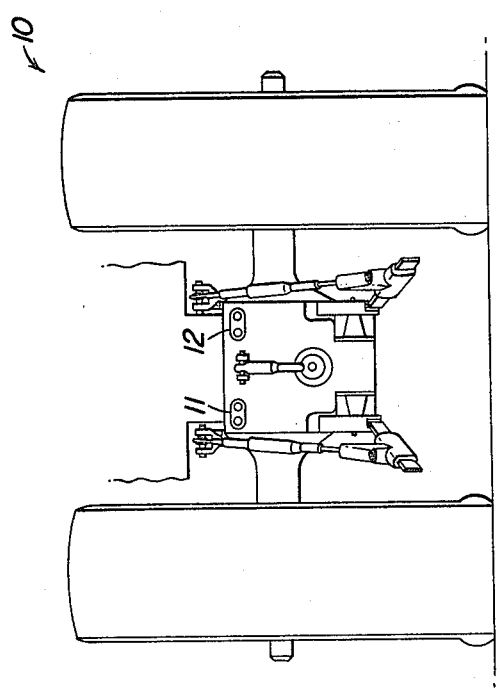
FIG. 1
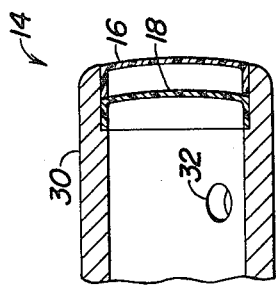
FIG. 2
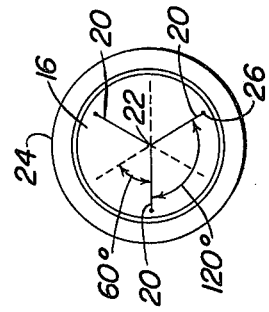
FIG. 3
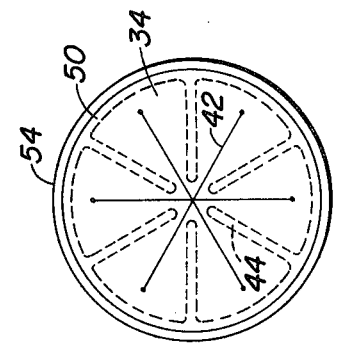
FIG. 4
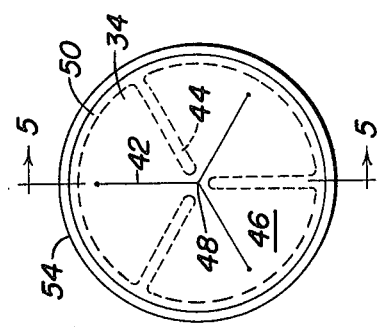
FIG. 5
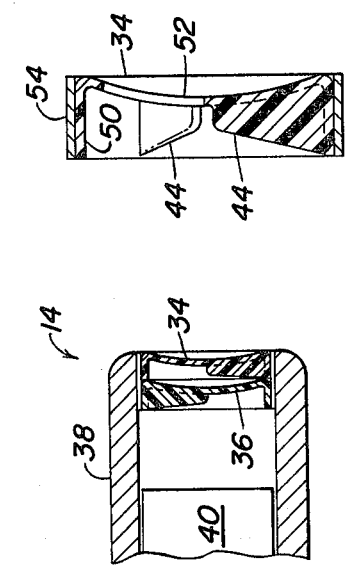
FIG. 6
FIG. 7

COUPLER COVER

BACKGROUND OF THE INVENTION

1. Field of the Invention

This invention relates to an improved coupler cover for preventing contaminants from contacting the outer end surface of a coupler. In particular, the improved coupler cover will prevent foreign contaminants from contacting the end surface of a female coupler located on the rear of agricultural vehicles.

2. Description of the Prior Art

Currently, most agricultural and some industrial tractors are equipped with one or more pairs of hydraulic hookups, such as female couplers, which are attached to the rear of the vehicle. These hydraulic couplers are designed to provide attachment means which mate with male couplers attached to an implement's hydraulic hoses. During the process of changing implements, the hydraulic hoses have to be disconnected and connected by the operator. In the process of disconnecting the male coupler from the female coupler, a small amount of oil tends to be trapped between the two ends of the couplers. This oil adheres to the end surface of the female coupler and provides an adhesive means on which dust, dirt or other foreign matter can accumulate. When the operator hooks on another implement, the foreign contaminant is forced into the hydraulic lines and causes havoc with the associated hydraulic apparatus.

In the past, manufacturers have tried to prevent such contamination by installing covers or boots over the end surface of the female couplers. Some of these boots contained a single slit through which the male coupler was inserted so as to connect to the female coupler. These single slit boots were partially effective in preventing the influx of foreign matter into the hoses in the coupled position. The reason for this was that the single slit did not have the ability to seal up against the entire circumference of the male coupler. The opening therebetween thus allowed dust or dirt to again come in contact with the end surface of the female coupler. A second disadvantage of the single slit boots was that the boots tended to fracture and tear at the ends of the slits after repeated use. This physical failure rendered the boots ineffective and necessitated replacement.

Other prior art covers have tried to overcome the physical failure problem by using more than one slit or by using various types of soft, pliable material. Although the cracking problem was less severe, the major contamination problem still remained. Now an improved coupler cover has been invented which rectifies the deficiencies of the prior art coupler covers.

The general object of this invention is to provide an improved coupler cover which will prevent foreign contaminants from contacting the end surface of a coupler. A more specific object of this invention is to provide an improved coupler cover which will protect the end surface of a female coupler.

Another object of this invention is to provide an improved coupler cover which will not tear or fracture as easily as conventional covers.

Still another object of this invention is to provide a low cost, easy-to-manufacture coupler cover.

A further object of this invention is to provide an improved coupler cover which provides a nearly complete seal when a male coupler is inserted through it.

Other objects and advantages of this invention will become apparent to one skilled in the art based upon the ensuing description.

SUMMARY OF THE INVENTION

Briefly, the objects of this invention can be realized by using the herein described improved coupler cover. This improved coupler cover comprises two diaphragms axially aligned adjacent to each other which contain a multiplicity of slits. The multiple slits are arranged in a spaced apart configuration and extend in an outward direction from the center of each diaphragm. The multiple slits of the first diaphragm are offset in position from the multiple slits of the second diaphragm. Secured to both diaphragms is a retainer which holds both of the diaphragms relative to the end surface of the coupler.

The combination of the two flexible diaphragms together with the offset slits provides a much improved seal for preventing the influx of foreign matter. The multiple slits also allow for a smaller degree of deflection of each diaphragm and therefore they tend to prolong the useful life of the coupler cover.

BRIEF DESCRIPTION OF THE DRAWINGS

FIG. 1 shows the rear of a tractor with two pairs of hydraulic hookups.

FIG. 2 shows a cross-sectional view of one embodiment of the improved coupler cover.

FIG. 3 shows an end view of the improved coupler cover as seen in FIG. 2.

FIG. 4 is a cross-sectional view of an alternative embodiment of the improved coupler cover inserted into a housing.

FIG. 5 shows a cross-sectional view of one diaphragm as seen in FIG. 4.

FIG. 6 is an end view of the improved coupler cover as seen in FIG. 5.

FIG. 7 is an end view of the improved coupler cover showing six slits having supporting ribs constructed on the inner surface.

DETAILED DESCRIPTION OF THE INVENTION

Referring now to FIG. 1, the rear of an agricultural tractor 10 is depicted having two pairs of hydraulic hookups 11 and 12. Each pair of hookups 11 and 12 contains means for attaching two hydraulic lines or hoses to it. One of the lines will carry oil to an attached farm implement and the other line will return the oil to a reservoir contained within the body of the tractor 10. Commonly, the hydraulic hookups 11 and 12 are female couplers which are designed to mate with suitable male couplers attached to one end of the hydraulic hoses. In the process of connecting and disconnecting the hydraulic couplers, a certain quantity of oil tends to become trapped between the female or male couplers. Such oil ends up adhered to the rear of the tractor 10, whereby it provides a bond for holding dust, dirt or other foreign contaminants to the tractor 10.

The improved coupler cover 14 (shown in FIG. 2) is designed to prevent these foreign contaminants from infiltrating into the hydraulic lines. The coupler cover 14 includes two diaphragms 16 and 18, respectively, axially aligned adjacent to each other. Each of the diaphragms 16 and 18 is constructed of a flexible, deformable, soft elastomeric material, such as rubber, which is capable of being repeatedly deformed without cracking.

Each of the diaphragms 16 and 18, which may be of any desired shape, contain a multiplicity of slits 20 (see FIG. 3) arranged so as to extend outward from the center 22 of each of the diaphragms 16 and 18. By multiplicity is meant three or more slits with six slits being a preferred number (see FIG. 7). Each of the slits 20 is preferably of equal length and should be arranged so as to be spaced an equal distance apart. In FIG. 3, the three slits in the outer diaphragm 16 are arranged 120 degrees apart and extend outward to approximately the perimeter 24. A small round hole 26 can be constructed at the outer end of each slit to aid in preventing tearing of the elastic material. Such construction is, however, a matter of preference and does not effect the functional operation of the coupler cover 14.

The second or inner diaphragm 18 is constructed exactly like the first diaphragm 16 but is positioned in such a manner that its slits 20 will be angularly offset in position from the slits 20 of the first diaphragm 16. Preferably, the slits 20 of the second diaphragm 18 will lie midway between two neighboring slits 20 on the first diaphragm 16. As shown in the arrangement in FIG. 3, the three slits of the second diaphragm 18 (shown in dotted lines) are 60 degrees offset from the three slits 20 of the first diaphragm 16. Other offset angles are feasible provided that the slits of the two diaphragms 16 and 18 are not arranged too close together.

Referring again to FIG. 2, the first and second diaphragms 16 and 18, respectively, are secured to a retainer 30 having a port hole 32. The retainer 30 is fastened to the housing of a vehicle so as to extend around a hydraulic hookup, such as shown in FIG. 1. The port hole 32 permits any trapped oil retained between the end surface of the female coupler and the surface of the second diaphragm 18 to be bled off.

Referring now to FIG. 4, an alternative embodiment of the improved coupler cover 14 is shown. This embodiment also employs a first and second diaphragm 34 and 36, respectively, which are designed to be inserted directly into a hydraulic housing 38. The housing 38 contains the female coupler 40 positioned a desired distance in from the second diaphragm 36.

As better seen in FIG. 6, each of diaphragms 34 and 36 (of which only diaphragm 34 is shown) is constructed from a flexible, deformable, soft elastomeric material having a multiplicity of slits 42. Constructed between two neighboring slits on one surface of each diaphragm 34 and 36 is a supporting rib 44. The ribs 44 are preferably constructed of the same elastomeric material as are the diaphragms 34 and 36. It is preferable to make the ribs 44 part of each of the diaphragms 34 and 36 such as by molding the elements together into a single member. The purpose of each rib 44 is to assist in deflecting each pie-shaped surface 46 of each of the diaphragms 34 and 36 back to its original position after the male coupler has been removed. The shape of each of the ribs 44 is not critical, but a shape similar to that shown in FIG. 5 wherein the rib 44 narrows in width as it approaches the center 48 of the diaphragm is advantageous. This configuration provides the extra strength at the periphery 50 of the diaphragm where it is needed.

The shape of the outer surface 52 of the diaphragm 34 or 36 can be either flat, concave or convex. The concave shape of outer surface 52 is preferred in that it provides less resistance when the operator inserts the male coupler. This concave shape also decreases the amount of travel needed to return the outer surface 52 to its original shape. This feature aids in prolonging the life of the improved coupler cover 14.

Surrounding the periphery 50 of the diaphragm 34 or 36 is a metal rim 54. The metal rim 54 is bonded or otherwise attached to the periphery 50 and is designed to be inserted into a receptacle such as the housing 38, as shown in FIG. 4. The width of the metal rim 54 can be varied so as to adjust the distance between the first diaphragm 34 and the second diaphragm 36. This allows each manufacturer to apply the coupler cover 14 to his particular housing 38 without encountering hookup problems.

While the invention has been described in conjunction with two specific embodiments, it is to be understood that many alternatives, modifications, and variations will be apparent to those skilled in the art in light of the aforegoing description. Accordingly, the invention is intended to embrace all such alternatives, modifications, and variations which fall within the spirit and scope of the appended claims.

We claim:

1. An improved coupler cover for preventing contaminants from contacting the end surface of a coupler, comprising:
   (a) first and second diaphragms axially aligned adjacent to each other, each of said first and second diaphragms containing multiple slits extending outward from the center thereof, said multiple slits of said first diaphragm being angularly offset from said multiple slits of said second diaphragm; and
   (b) retainer means secured to said first and second diaphragms for positioning said diaphragms relative to said end surface of said coupler.

2. The improved coupler cover of claim 1 wherein each of said first and second diaphragms is constructed from a deformable elastomeric material.

3. The improved coupler cover of claim 2 wherein each of said first and second diaphragms include supporting ribs, said supporting ribs being spaced approximately equal angular distances from neighboring slits.

4. The improved coupler cover of claim 3 wherein each of said first and second diaphragms contains six equal length slits arranged 60 degrees apart.

5. The improved coupler cover of claim 4 wherein each of said first and second diaphragms are circular in shape with a concave outer surface and a convex inner surface on which said supporting ribs are constructed.

6. The improved coupler cover of claim 5 wherein each of said diaphragms with supporting ribs is a single member.

7. An improved coupler cover for covering the end surface of a coupler, comprising:
   (a) first and second elastomeric diaphragms axially aligned adjacent to each other, each of said first and second diaphragms containing multiple slits extending outward from the center thereof, said multiple slits of said first diaphragm being angularly offset from said multiple slits of said second diaphragm, and each of said first and second diaphragms further including supporting ribs, said supporting ribs being spaced approximately equal angular distances from neighboring slits.

8. An improved coupler cover for preventing contaminants from contacting the end surface of a female coupler having housing means associated therewith, comprising:
   (a) first and second diaphragms positioned in said housing means and axially aligned adjacent to each other, each of said first and second diaphragms containing at least three slits extending outward from the center thereof to form three equal sections, said slits of said first diaphragm being angularly offset from the slits of the second diaphragm so as to be positioned midway between said slits of said second diaphragm; and (b) first and second metal rims mounted to and surrounding the periphery of said first and second diaphragms, respectively, said metal rims being secured to said housing means to retain said diaphragms in said housing.

9. The improved coupler cover of claim 8 wherein said diaphragms are formed from an elastomeric material.

10. The improved coupler cover of claim 8 wherein said first and second diaphragms include supporting ribs, said supporting ribs being positioned approximately equal angular distances from adjacent slits.

11. The improved coupler cover of claim 10 wherein each of said diaphragms with supporting ribs is a single member.

12. The improved coupler cover of claim 8 wherein each of said diaphragms has a concave outer surface.

13. The improved coupler cover of claim 8 wherein each of said diaphragms has a convex outer surface.

* * * * *